United States Patent
Singer

(10) Patent No.: US 8,712,363 B2
(45) Date of Patent: Apr. 29, 2014

(54) POWER-SAVING RECEIVER

(75) Inventor: Steven Mark Singer, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 444 days.

(21) Appl. No.: 12/865,043

(22) PCT Filed: Nov. 19, 2008

(86) PCT No.: PCT/EP2008/065829
§ 371 (c)(1),
(2), (4) Date: Oct. 12, 2010

(87) PCT Pub. No.: WO2009/095118
PCT Pub. Date: Aug. 6, 2009

(65) Prior Publication Data
US 2011/0065413 A1 Mar. 17, 2011

(30) Foreign Application Priority Data

Jan. 28, 2008 (GB) .................................. 0801520.8

(51) Int. Cl.
*H04B 1/16* (2006.01)
*H04W 52/02* (2009.01)

(52) U.S. Cl.
CPC .................................... *H04W 52/02* (2013.01)
USPC ........................................ 455/343.1; 455/572

(58) Field of Classification Search
CPC ... H04B 1/1607; H04B 1/3883; H04W 52/02; H04W 52/029; H04W 52/0229; H04W 88/022; H04W 52/028; H04W 52/0216; G06K 19/0723; H04M 1/0262; H04M 19/08; H04M 1/04; Y02E 60/12; H02J 7/0044; H02J 17/00
USPC ..................................... 455/574, 343.1–343.6
See application file for complete search history.

(56) References Cited

U.S. PATENT DOCUMENTS

| | | | |
|---|---|---|---|
| 8,447,260 B2 * | 5/2013 | Rofougaran | 455/343.1 |
| 2002/0013157 A1 * | 1/2002 | Ichikawa | 455/127 |
| 2003/0128145 A1 | 7/2003 | Naka et al. | |
| 2003/0162496 A1 | 8/2003 | Liu | |
| 2003/0203722 A1 * | 10/2003 | Karlquist et al. | 455/226.1 |
| 2004/0072597 A1 * | 4/2004 | Epperson et al. | 455/572 |
| 2005/0084037 A1 | 4/2005 | Liang | |
| 2006/0030358 A1 | 2/2006 | Kappes | |
| 2007/0135081 A1 * | 6/2007 | Bultan et al. | 455/343.1 |
| 2007/0213028 A1 * | 9/2007 | Shohara et al. | 455/343.1 |
| 2008/0292031 A1 * | 11/2008 | Sibers | 455/574 |

* cited by examiner

*Primary Examiner* — Lana N Le
(74) *Attorney, Agent, or Firm* — Vorys, Sater, Seymour and Pease LLP; Vincent M DeLuca

(57) ABSTRACT

A signal receiver capable of operating in two modes: a normal mode for reception and decoding of signals and a detection mode for detecting the presence of signals, the signal receiver having: a functional unit that can operate in two manners: a first manner having relatively low power consumption and relatively poor accuracy and a second manner having relatively high power consumption and relatively high accuracy, and a controller for causing the functional unit to operate in the first manner when the receiver is in its detection mode and in the second manner when the receiver is in its normal mode.

19 Claims, 2 Drawing Sheets

POWER-SAVING RECEIVER

Various radio devices have a low-power mode in which their energy consumption is reduced by disabling some of their functions. Such a mode is especially useful in devices that have a limited energy supply, such as those that are powered by batteries.

Once a device has entered a low power mode it must be responsive to some condition to wake from that mode and enter a normal or less limited mode of operation. One such condition could be direct input by a user to an input component of the device, such as a push-button. However, this requires that the device be accessible to a user and that it be equipped with a suitable input component. Another such condition, which is applicable to devices that are radio receivers, is the detection of radio signals of the type used by the device. This approach has the advantage that the device can be woken remotely without the need for a user to intervene. Another advantage is that the device can be relied upon to automatically leave its low power mode when it might be required to receive data. The device can therefore be allowed to enter its low power mode more often, saving more energy.

Radio signals are always present at some level. Therefore, in order for a device to wake in response to detecting radio signals the device must be selective: responding only to certain radio signals in order to wake from its low power mode. One option is for the device to wake from its low power mode when any radio signals above a certain power are detected. However, the prevalence of radio transmitters in portable devices such as mobile phones and PDAs (portable digital assistants) means that this condition could cause the device to wake more often than necessary. Another option is for the device to wake in response to detecting any signal within a certain frequency band. However, some frequency bands, such as the ISM (industrial, scientific and medical) band are shared by many radio systems and this again could cause the device to wake more often than necessary. Therefore, in order for the device to detect radio signals in its low power state it is conventional for it to power up its radio receiver periodically to check for signals of the specific type through which the device would normally receive data. These could, for example be signals that use a specific modulation scheme in a specific frequency band or using a specific frequency hopping sequence or spreading code. However, when the radio receiver is turned on it typically uses a significant amount of energy. Therefore, periodically powering up the receiver reduces the benefits of the low power mode.

There is therefore a need for a way of detecting radio signals that consumes less energy.

According to the present invention there is provided a signal receiver capable of operating in two modes: a normal mode for reception and decoding of signals and a detection mode for detecting the presence of signals, the signal receiver having: a functional unit that can operate in two manners: a first manner having relatively low power consumption and relatively poor accuracy and a second manner having relatively high power consumption and relatively high accuracy, and a controller for causing the functional unit to operate in the first manner when the receiver is in its detection mode and in the second manner when the receiver is in its normal mode.

The functional unit may be or comprise a clock and/or a power supply and/or a filter and/or an amplifier.

The functional unit may comprise two components each capable of providing the function of the functional unit, one of the components providing the function in the first manner having relatively low power consumption and relatively poor accuracy and the other of the components providing the function in the second manner having relatively high power consumption and relatively high accuracy; only the said one of the components being operational when the receiver is in its detection mode. Alternatively, the functional unit may comprise only a single component capable of providing the function of the functional unit, the component being operable in two operational modes, one of the modes having relatively low power consumption and relatively poor accuracy and the other of the modes having relatively high power consumption and relatively high accuracy; the functional unit operating in the said one of the modes when the receiver is in its detection mode.

The signal receiver may comprise a signal detector for detecting signals incoming to the device of a predetermined format, the operation of the signal detector being dependent on the functional unit, and the receiver being such as to operate the signal detector when operating in the detection mode.

The signal detector may be configured to signal the controller if it detects a signal incoming to the device of the predetermined format. The controller may be configured to, on being so signalled, automatically cause the device to enter the normal mode.

The present invention will now be described by way of example with reference to the accompanying drawing, in which.

Figure 1:
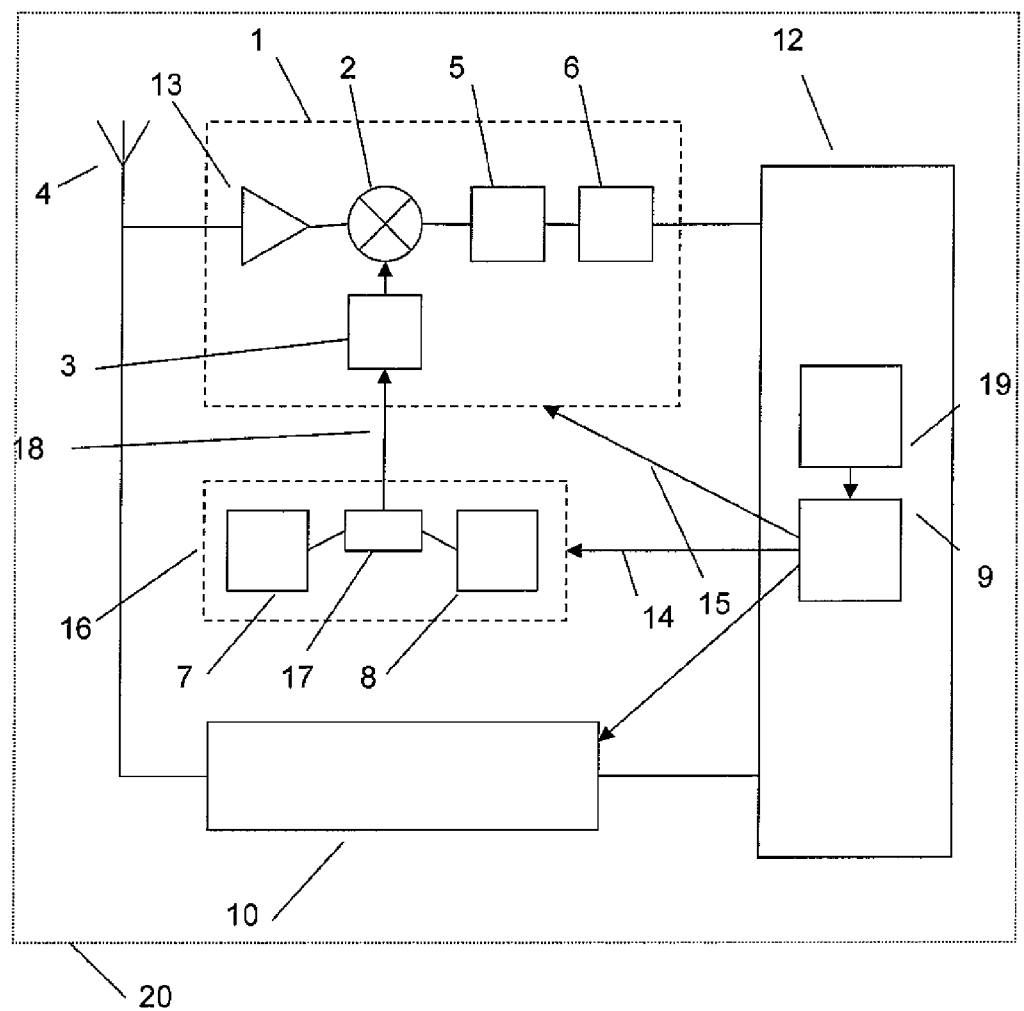
FIG. 1 is a schematic diagram of a first radio device.

The device of FIG. 1 comprises a receiver section 1 for receiving radio signals. The receiver section includes a local oscillator 2 which generates an output that is mixed in a mixer 3 with the signal received at an antenna 4 in order to downconvert the received signal. The downconverted signal is bandpass filtered by filter 5 and then passes to a detector 6 that can detect and decode any traffic data within the received signal.

In the device of FIG. 1 the local oscillator 2 can be clocked by either of two clocks 7, 8. Clock 7 is a relatively high accuracy clock whereas clock 8 is a lower accuracy clock which consumes less power than clock 7. A controller 9 signals the clocks so as to control which one of the clocks is in use at any time. The controller is configured so that when the device is in a low power mode the lower power clock 8 is used, whereas when the device is in its normal mode the higher power clock 7 is used.

It has been identified that the clock of the receiver is a major user of power when the receiver is active, but that for simply detecting the presence of signals a lower accuracy clock than is desirable for accurately decoding signals in normal use can successfully be used. Therefore, the device of FIG. 1 can offer power-saving benefits when in low power mode.

The device of FIG. 1 will now be described in more detail. The device is a radio transceiver. The device comprises the antenna 4, the receiver section 1, a transmitter section 10 for upconverting signals to be transmitted from antenna 4, a baseband section 12 and clocks 7 and 8. The baseband section performs baseband processing of received signals and signals to be transmitted, including processing received traffic data and generating traffic data for transmission by the device. It is also responsible for control functions, for example for selecting whether the device is to operate in normal mode or low power mode, for selecting which of the clocks 7, 8 is to operate and for handling local user interface functions.

The transmitter section 10 takes as its input traffic data from the baseband section. It upconverts that data as appropriate for the radio system that is in use so as to form radio signals for transmission. The transmitter could be a conventional transmitter.

Receiver 1 could be of any appropriate design. In practice the design of the receiver will depend on the radio system that is in use. It may conveniently be a low-IF (intermediate frequency) quadrature receiver. However, other types of receiver could be used. In the case of a quadrature receiver the signal received from the antenna is split into two paths. The signals in each path are mixed with signals derived from the local oscillator 3 that are of the same frequency but are 90° out of phase with respect to each other. The frequency of local oscillator 3 is selected so as to frequency shift signals whose frequencies lie in the desired receive channel into the passband of filters analogous to filter 5. The outputs of those filters can be applied directly to signal detector 6 which processes them, conveniently in the digital domain, to detect traffic data therein. The receiver includes an amplifier 13 which amplifies signals received from the antenna. The receiver may perform multiple downconversion steps in series.

In a receiver of the type illustrated in FIG. 1 the frequency of the local oscillator 2 is set in accordance with the frequency of signals that are to be received. For this purpose the local oscillator 2 and/or the clocks 7, 8 are controlled by the baseband section 12 so as to allow signals of the desired frequency to be received. The local oscillator could have a frequency divider or multiplier that generates the local oscillator signal at the desired frequency in dependence on the signal at the clock input.

The baseband section 12 includes a power controller 9 which controls the operation of the clocks 7, 8 via line 14 and the operation of receiver 1 via line 15. The clocks can be considered to form part of a clock function 16 which can operate in either of two modes under the control of line 14. In a first mode clock 7 is active, clock 8 is inactive and the multiplex switch 17 is set so that the output 18 of the clock function is provided by clock 7. In a second mode clock 8 is active, clock 7 is inactive and the multiplex switch 17 is set so that the output 18 of the clock function is provided by clock 8

Clock 7 is a relatively high accuracy clock. Clock 8 uses less power than clock 7 but is less accurate. The clocks could be configured in various ways, but as one example clock 7 could be run from a crystal oscillator and clock 8 could be run from an oscillator on silicon. Because clock 7 has a higher accuracy than clock 8, receiving signals with clock 7 would be expected introduce less noise than if the signals were received using clock 8. For illustration, clock 8 might be insufficiently accurate to allow the receiver to recover a demodulated signal; or might be able to recover such a signal but with too much noise for it to be useful. However, it is still sufficiently accurate that when using it the radio receiver can detect that a signal is present.

A mode control section 19 of baseband section 9 determines whether the device should operate in its low-power mode or its normal mode, and signals this to power controller 9. The selection of mode could be made in any convenient way. For example, the low-power mode could be entered if the device has not transmitted or received traffic data for more than a pre-set time, or when it is not transmitting or receiving data during pre-set times of the day. The normal mode could be entered if, when the device is in its low-power mode, the device's user interface is activated or the device detects activity that is determined to represent the presence of radio traffic of the type that the device is intended to receive.

The power controller 9 controls the operation of the components of the device in accordance with whether the device is operating in its normal mode or its power-saving mode. In the normal mode all components of the device except clock 8 are active and the switch 17 is set so that the receiver is clocked by clock 7. In the low-power mode power controller deactivates the components of the transmitter section 10 and periodically activates the receiver section (e.g. for 10 ms every 1 s) to permit it to detect traffic. In the low-power mode clock 8 is inactive, clock 7 is active and switch 17 is set so that the receiver is clocked by clock 8.

Clock 8 is less accurate than clock 7 and so the output from the receiver would be expected to be relatively noisy when clock 7 is in use. For this reason clock 8 is not used in the device's normal mode of operation. However, in the low-power mode the device does not need to fully decode the detected data: it simply needs to detect that there is signal present of the type that might be decoded by the receiver if it were to use the clock 7. The detection of a signal may be performed by attempting to detect a carrier in the output of the receiver (and assuming that a signal is present if a carrier is detected), or may be a probabilistic process in which the signal output of the receiver is tested against one or more predetermined measures that have been determined to be indicative of a signal being present. One example is the strength with which a predetermined carrier or pilot tone is detected. The baseband section may be configured so that in response to a signal being detected when the device is operating in low-power mode, it switches into normal mode. Alternatively, it may switch into an intermediate mode of operation in which it uses clock 8 instead of clock 7 in order to receive signals and then attempts to decode the received signal. If a signal is then successfully decoded within a pre-set time period then the device switches into normal mode, and otherwise it returns to low-power mode.

The device shown in FIG. 1 could be implemented as a single physical unit, for example on a single integrated circuit (IC) 20, which includes the clocks 7 and 8.

The embodiments described above have the capability of saving power through restricting power to a higher-power-consumption clock when it is not needed. In addition to the clock, other functions of the device can be controlled in an analogous way. Various functions of the device may be capable of operating in two power modes: one mode being of higher power consumption but greater accuracy and the other mode being of lower power consumption but lower accuracy. If the lower accuracy mode is satisfactory for detecting whether a signal is present then the device may be configured so that the higher accuracy mode is not adopted when the device is simply checking for the presence of a signal. In addition, preferably the lower accuracy mode is not adopted when the higher accuracy mode is adopted. Examples of such functions are as follows:

1. Power supply. The device may have two modes of power supply: one of greater stability but greater power consumption and one that is more noisy but uses less power. The system may use the noisier power supply whilst performing signal detection and then use the cleaner power supply if it looks like a signal may be present.

2. Filter: The device may have two modes of filtering: one of sharper bandpass characteristics but greater power consumption and one that is less selective but uses less power. The system may use the less selective filter whilst performing signal detection and the sharper filter for receiving detected signals.

3. Amplifier: The device may have two modes of amplification: one of better linearity but greater power consumption and one that is less linear but uses less power. The system may use the lower linearity amplifier for signal detection and the higher linearity amplifier for receiving detected signals.

In each case, each mode may be implemented by respective hardware, or the same hardware may be used but with different operating parameters. Two or more of these operating modes may be combined, allowing further power to be saved.

Other components than the local oscillator could be dependent on the clock frequency. For example, one or more of the filters could operate in dependence on the clock frequency, so as to alter its passband in accordance with the desired receive frequency. These components could operate in dependence on the lower quality clock during signal detection and the higher quality clock during signal reception.

Figure 2:
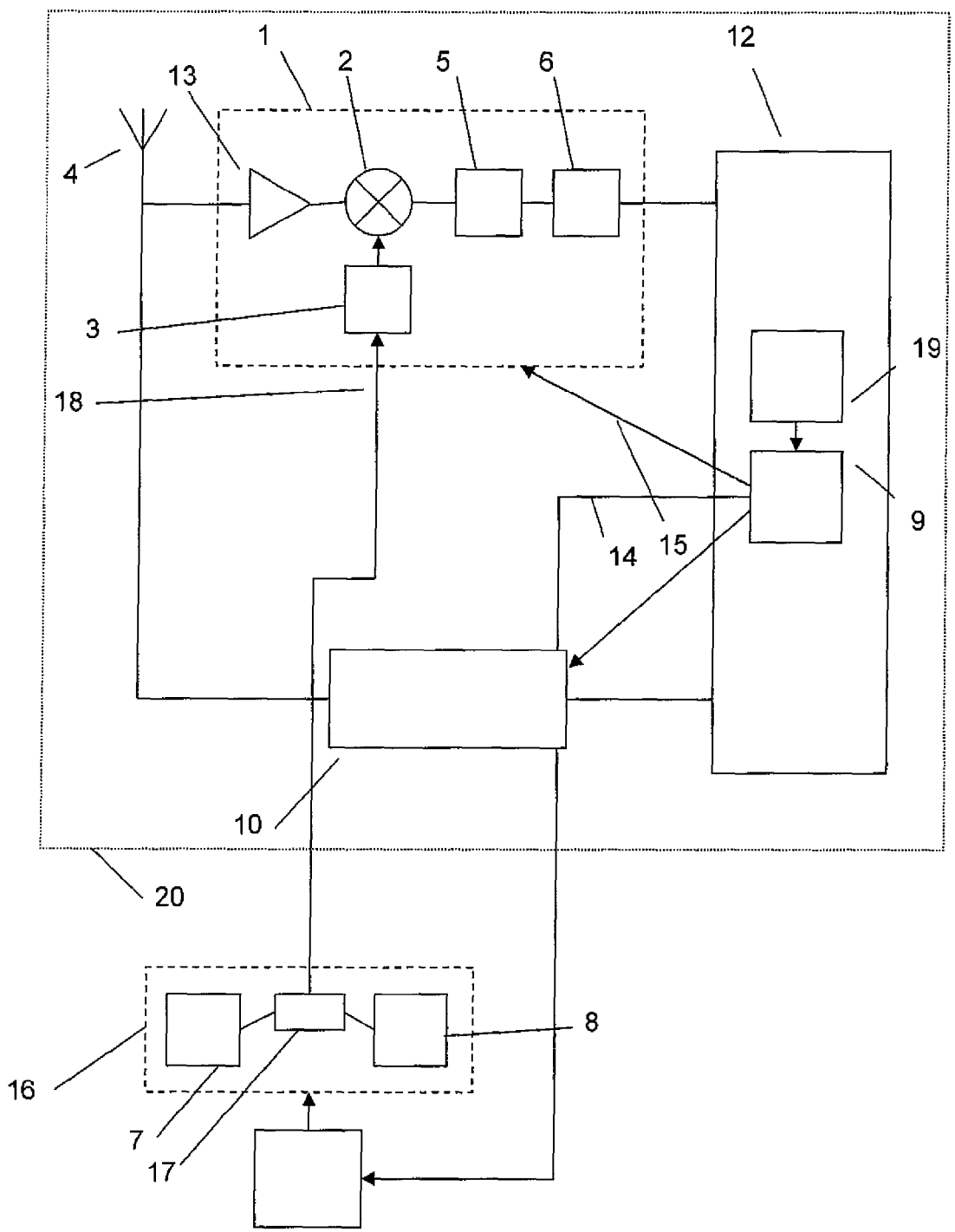
FIG. 2 is a schematic diagram of a second radio device.

FIG. 2 shows an alternative implementation in which the clocks 7 and 8 are implemented separately from the other components. In this embodiment the clocks 7, 8 are still controlled so as to save power, by powering down the higher power consumption clock 8 when it is not needed.

In the embodiment of FIG. 2, equivalent components are numbered as for FIG. 1. In this embodiment the antenna, transmitter receiver and baseband sections are on a single integrated circuit 21. The clocks 7 and 8 are implemented off that integrated circuit and provide input to the integrated circuit in the form of clock signals on input lines 22, 23. A clock controller 24 is also implemented off the integrated circuit. The clock controller receives input from the integrated circuit as shown at 25 and in response to that input arranges for power to be supplied to one or other of the clocks 7, 8. The input to the clock controller could take various forms. Examples are as follows.

1. The clock controller could receive a dedicated signal from the baseband section which indicates which clock is required to be powered, or that indicates whether the device is in low-power mode or normal mode.

2. The clock controller could receive a signal from the baseband section which indicates the level of accuracy desired from the clock. The clock controller could then select one of the clocks as appropriate, given knowledge of the accuracy of each of the clocks. This allows flexibility for the integrated circuit to operate efficiently with off-chip clocks of various types that might be unknown to the designer of the integrated circuit.

3. The clock controller could infer which mode the device is in from a signal that is not dedicated for this purpose. For example, it could infer the device's power mode from the power consumption of the integrated circuit.

In each case, for signal detection the respective part(s) of the radio receiver, which would normally have to have relatively high tolerances may be run with lower tolerance. The receiver can then switch to higher tolerance when signal is to be received.

Similarly, one of clocks 7 and 8 could be implemented on the integrated circuit, and the other off-chip. The clocks would still be used in accordance with the underlying logic described above.

The integrated circuit may include non-volatile memory that can be used to store program code (firmware) for execution on the integrated circuit. The program code could, for instance, implement functions of the baseband section 11. The integrated circuit could be such that the program code can be updated by uploading new firmware on to the integrated circuit. This facility can allow the integrated circuit to be upgraded to have the functionality described above even if it did not possess it before. Thus, the integrated circuit could be upgraded through new firmware to cause it to switch between clocks if it previously had access to more than one clock, or to control multiple external clocks as illustrated in FIG. 2. The same principle could be used to control the modes of other components such as a power supply, an amplifier or a filter.

The conditions used to determine when to switch from the signal detection mode to the signal reception mode will depend on the system that is in use. Examples include a signal strength greater than a pre-set value in a particular filter window being detected, a signal-to-interference ratio greater than a pre-set value being detected by a receiver, and signal being received at less than a pre-set bit error rate.

In the examples above components of the device were described as being implemented on an integrated circuit. The device could be embodied in other ways, for example as discrete components on a circuit board or by multiple ICs The receiver could operate in accordance with any appropriate protocol. Examples include Bluetooth, wireless local area network (e.g. IEEE 802.11), GSM and 3G protocols.

One or both of clocks 7 and 8 could be specific to the receiver section, but it is convenient for clock 7 at least to provide clock signals for use by both the transmitter and the receiver sections.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A signal receiver capable of operating in two modes: a normal mode for reception and decoding of signals and a detection mode for detecting the presence of signals, the signal receiver having:
    at least a power supply that can operate in two manners: a first manner having relatively low power consumption and relatively poor accuracy and a second manner having relatively high power consumption and relatively high accuracy, and
    a controller for causing said clock, power supply or filter to operate in the first manner when the receiver is in its detection mode and in the second manner when the receiver is in its normal mode;
    wherein said power supply comprises two components each capable of providing the function of the power supply, the first of the components providing the function in the first manner, having relatively low power consumption and relatively poor stability, and the second of the components providing the function in the second manner, having relatively high power consumption and relatively high stability;
    wherein only said first of the components is operational when the receiver is in its detection mode.

2. A signal receiver as claimed in claim 1, comprising a signal detector for detecting incoming signals of a predetermined format, the operation of the signal detector being dependent on said at least one clock, power supply and filter, and the receiver being such as to operate the signal detector when operating in the detection mode.

3. A signal receiver as claimed in claim 2, wherein the signal detector is configured to signal the controller if it detects an incoming signal of the predetermined format, and the controller is configured to, on being so signaled, automatically cause the receiver to enter the normal mode.

4. A signal receiver as claimed in claim 1, wherein said receiver does not fully decode detected signals when operating in said detection mode.

5. A signal receiver as claimed in claim 4, wherein detecting the presence of signals is performed by detecting a carrier in an output of said receiver.

6. A signal receiver capable of operating in two modes: a normal mode for reception and decoding of signals and a detection mode for detecting the presence of signals, the signal receiver having:
 a clock that can operate in two manners: a first manner having relatively low power consumption and relatively poor accuracy and a second manner having relatively high power consumption and relatively high accuracy, and
 a controller for causing said clock to operate in the first manner when the receiver is in its detection mode and in the second manner when the receiver is in its normal mode, the signal receiver further having:
 at least one of a power supply and a filter that can operate in two manners: a first manner having relatively low power consumption and relatively poor accuracy and a second manner having relatively high power consumption and relatively high accuracy, and
 said controller causing said power supply or filter to operate in the first manner when the receiver is in its detection mode and in the second manner when the receiver is in its normal mode;
 wherein said power supply comprises two components each capable of providing the function of the power supply, the first of the components, providing the function in the first manner, having relatively low power consumption and relatively poor stability and the second of the components, providing the function in the second manner, having relatively high power consumption and relatively high stability;
 wherein only said first of the components is operational when the receiver is in its detection mode.

7. A signal receiver as claimed in claim 6, wherein said clock comprises two components each capable of providing the function of the clock, the first of the components providing the function in the first manner having relatively low power consumption and relatively poor accuracy, and the second of the components providing the function in the second manner having relatively high power consumption and relatively high accuracy;
 wherein only said first of the components is operational when the receiver is in its detection mode.

8. A signal receiver as claimed in claim 6, wherein said clock comprises only a single component capable of providing the function of the clock, the component being operable in two operational modes, one of the modes having relatively low power consumption and relatively poor accuracy, and the other of the modes having relatively high power consumption and relatively high accuracy;
 wherein the single component operates in said one of the modes when the receiver is in its detection mode.

9. A signal receiver as claimed in claim 6, comprising a signal detector for detecting incoming signals of a predetermined format, the operation of the signal detector being dependent on said clock, and the receiver being such as to operate the signal detector when operating in the detection mode.

10. A signal receiver as claimed in claim 9, wherein the signal detector is configured to signal the controller if it detects an incoming signal of the predetermined format, and the controller is configured to automatically cause the receiver to enter the normal mode upon being so signaled.

11. A signal receiver as claimed in claim 6, wherein said receiver does not fully decode detected signals when operating in said detection mode.

12. A signal receiver as claimed in claim 11, wherein detecting the presence of signals is performed by detecting a carrier in an output of said receiver.

13. A signal receiver capable of operating in two modes: a normal mode for reception and decoding of signals and a detection mode for detecting the presence of signals, the signal receiver having:
 a filter that can operate in two manners: a first manner having relatively low power consumption and relatively poor accuracy and a second manner having relatively high power consumption and relatively high accuracy, and
 a controller for causing said filter to operate in the first manner when the receiver is in its detection mode and in the second manner when the receiver is in its normal mode, the signal receiver further having:
 at least one of a power supply and a clock that can operate in two manners: a first manner having relatively low power consumption and relatively poor accuracy and a second manner having relatively high power consumption and relatively high accuracy, and
 said controller causing said power supply or clock to operate in the first manner when the receiver is in its detection mode and in the second manner when the receiver is in its normal mode;
 wherein said power supply comprises two components each capable of providing the function of the power supply, the first of the components providing the function in the first manner having relatively low power consumption and relatively poor stability, and the second of the components providing the function in the second manner having relatively high power consumption and relatively high stability;
 wherein only the said first of the components is operational when the receiver is in its detection mode.

14. A signal receiver as claimed in claim 13, wherein said filter comprises only a single component capable of providing the function of the filter, the component being operable in two operational modes, one of the modes having relatively low power consumption and relatively poor accuracy, and the other of the modes having relatively high power consumption and relatively high accuracy;
 wherein the single component operates in said one of the modes when the receiver is in its detection mode.

15. A signal receiver as claimed in claim 13, further comprising a signal detector for detecting incoming signals of a predetermined format, the operation of the signal detector being dependent on said filter, and the receiver being such as to operate the signal detector when operating in the detection mode.

16. A signal receiver as claimed in claim 15, wherein the signal detector is configured to signal the controller if it detects an incoming signal of the predetermined format, and the controller is configured to automatically cause the receiver to enter the normal mode upon being so signaled.

17. A signal receiver as claimed in claim 13, wherein said receiver does not fully decode detected signals when operating in said detection mode.

18. A signal receiver as claimed in claim 17, wherein detecting the presence of signals is performed by detecting a carrier in an output of said receiver.

19. A signal receiver capable of operating in two modes: a normal mode for reception and decoding of signals and a detection mode for detecting the presence of signals, the signal receiver having:
- a filter that can operate in two manners: a first manner having relatively low power consumption and relatively poor accuracy and a second manner having relatively high power consumption and relatively high accuracy, and
- a controller for causing said filter to operate in the first manner when the receiver is in its detection mode and in the second manner when the receiver is in its normal mode, wherein said filter comprises two components each capable of providing the function of the filter, the first of the components providing the function in the first manner having relatively low power consumption and relatively poor accuracy, and the second of the components providing the function in the second manner having relatively high power consumption and relatively high accuracy;
- wherein only the said first of the components is operational when the receiver is in its detection mode.

* * * * *